M. HALLENBECK.
Improvement in Harvesters.
No. 130,041.  Patented July 30, 1872.
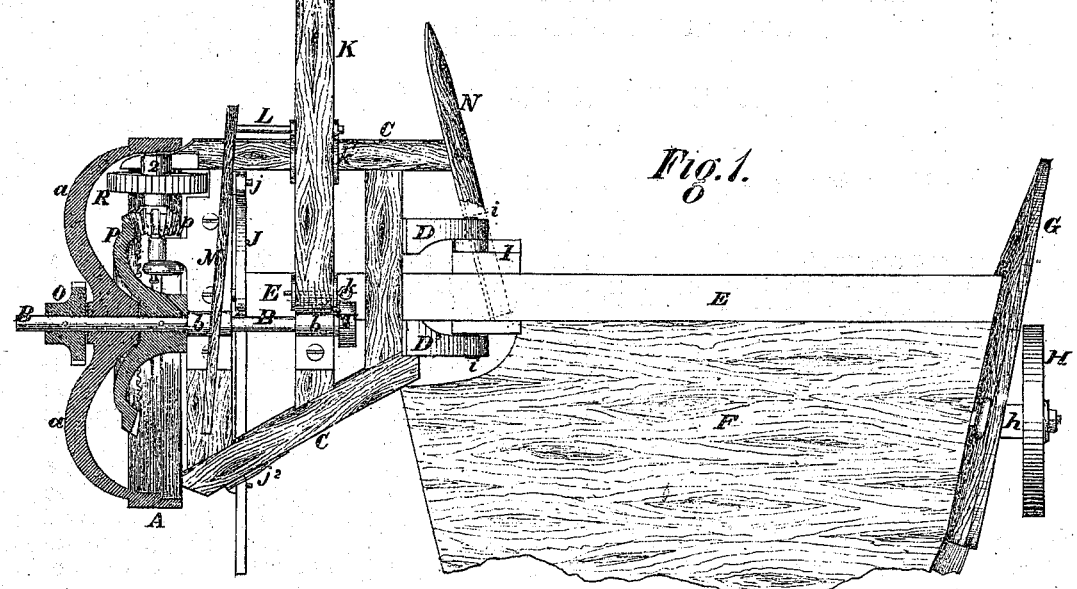
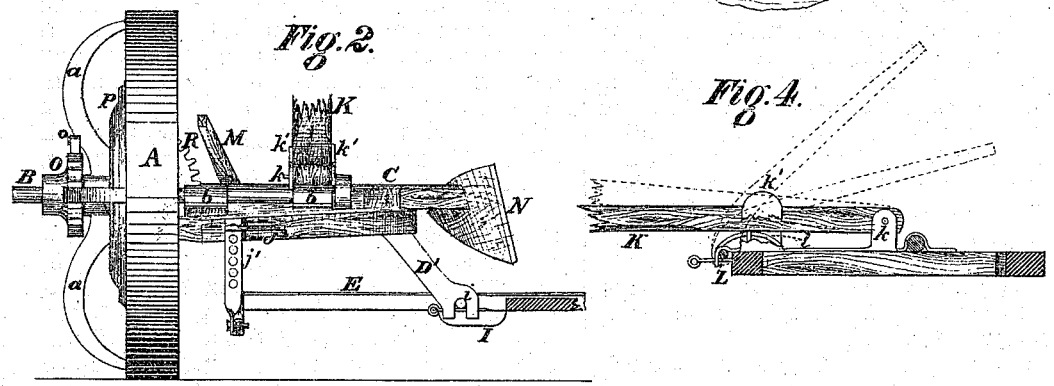
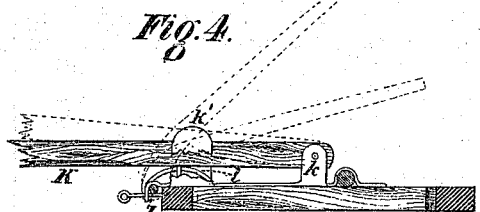
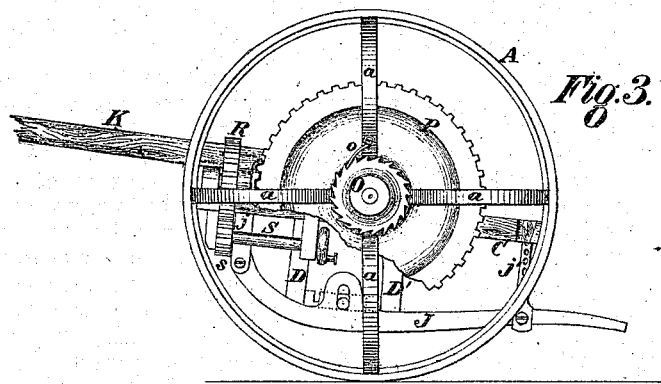
Witnesses.
J. Snowden Bell
Jos. S. Peyton
Martin Hallenbeck
by his Atty
Wm. D. Baldwin

UNITED STATES PATENT OFFICE.

MARTIN HALLENBECK, OF ALBANY, NEW YORK, ASSIGNOR TO ALFRED BLAKER, OF NEWTOWN, PENNSYLVANIA.

IMPROVEMENT IN HARVESTERS.

Specification forming part of Letters Patent No. 130,041, dated July 30, 1872.

*To all whom it may concern:*

Be it known that I, MARTIN HALLENBECK, of the city and county of Albany, in the State of New York, have invented a new and useful Improvement in Reaping-Machines, of which the following is a specification:

My invention relates to that class of reaping-machines having one driving-wheel and a cutting apparatus opposite the tread of the driving-wheel, as in the well-known Ketchum machine.

The object of my invention is to render the distance of the cutting apparatus from the ground adjustable without raising or lowering the main frame on its axle; and the improvement consists in combining the main frame mounted on the axle of the driving-wheel with the finger-beam supported at its outer end by a grain-wheel and pivoted to the main frame at the point which ordinarily constitutes its inner or heel end, but prolonged inward and connected with a lever pivoted underneath the main frame, turned up at its front end to form a shoe, and having a handle in rear to operate it, by which lever the finger-beam may be rocked upon its joint to raise or lower it, as hereinafter described.

The accompanying drawing shows so much of a reaping-machine embodying my improvement as is necessary to illustrate the invention herein claimed, the driver's seat, cutters, and guards being omitted.

Figure 1 is a plan or top view with the driving-wheel, ratchet-wheel, and main gear-wheel in section and the rear portion of the platform broken away; Fig. 2, a rear elevation with the outer portion of the finger-beam and platform removed; Fig. 3, an elevation as seen from the outer side of the driving-wheel; and Fig. 4, a partial section and elevation of the main frame, tongue, and lifting apparatus.

The driving-wheel A is made with deeply-curved spokes $a$, and turns freely on the main driving-shaft B, which turns freely in bearings $b$ on the main frame C. This main frame is made in the form shown in the drawing, being of a length less than the diameter of the driving-wheel. Down-hangers D D' project from the inner side of the main frame. A finger-beam, E, has a platform, F, attached to it, and also a divider, G, at its outer end. A grain-wheel, H, is mounted on an axle, $h$, adjustable up and down by a slot and set-screw or other equivalent device to raise or lower that end of the finger-beam. A shoe or butt-slide, I, is secured to the finger-beam at the inner or heel end of the cutting apparatus and is provided with lugs $i$, which enter journals in the down-hangers, and thus form a joint, on which the finger-beam oscillates. The boxes of these journals may be so constructed as to permit the finger-beam readily to be connected with or disconnected from the down-hangers. Instead, however, of terminating the finger-beam at the shoe, I prolong it inward and connect it with a lever, J, pivoted to an arm, $j$, beneath the main frame and connected at its rear end with a link, $j^1$, having a series of holes in it, into any one of which holes a pin on the frame takes; a spring, $j^2$, keeps the link $j^1$ in place. A ratchet-bar might be substituted for the holes, or a slot and set-screw. The inner end of the finger-beam enters a slot in the lever, as shown in Fig. 3, and is thus allowed a slight degree of vertical play on its pivots $i$, independently of the lever. By releasing the link $j^1$ the attendant can raise or lower the inner end of the finger-beam and thus cause it to rock on the joint at $i$, and, as the driving-wheel and grain-wheel support the machine at opposite sides, the joint itself rises and falls, thus correspondingly raising or lowering the finger-beam at its heel end; its divider-end being adjusted by the slot and set-screw which regulate the grain-wheel axle. The tongue K is pivoted at $k$ to the main frame near the axle, or it may be pivoted to the axle, and plays freely up and down between lugs $k'$. A lifting cam or arm $l$ plays freely through a loop on the under side of the tongue and is fixed on a rock-shaft, L, oscillating in proper bearings on the front of the frame and controlled by a hand-lever, M. By this device the attendant can rock the main frame and cutting apparatus so as to raise or lower the points of the guards. A shield or guard, N, deflects the grain inward and protects the down-hangers and joint from becoming clogged. The driving-wheel, it will be observed, is mounted outside of the main frame. A ratchet-wheel, O, turns with the axle, on the outside of the drive-wheel, with which it is connected by a pawl, o, on the wheel, thus constituting a backing-ratchet. When a rake is used it may be driven from a gear, T, on the inner end of the main axle. The main bevel-gear P is likewise fast on the axle and is arranged inside the driving-wheel, but outside the frame. As shown in Fig. 1, this wheel is made with a long bearing to give it a firm support on the axle, and is recessed on its outer side to receive the hub of the driving-wheel. This bevel-gear drives a corresponding gear, p, on a counter-shaft, which carries a spur-wheel, R, meshing into a corresponding pinion, s, on a crank-shaft, S, from which the cutters are driven in the usual way.

The operation of the machine will be readily comprehended from the foregoing description.

I claim as my invention—

The lever J, constructed, as described, in the form of a runner, pivoted in front beneath the frame, having a handle in its rear and a central slot for the reception of the inner end of the long finger-beam hinged at a point intermediate of its length, to adjust the height of cut, as set forth.

MARTIN HALLENBECK.

Witnesses:
AARON ROSE,
JAS. ANDERSON.